(12) United States Patent
Gilling et al.

(10) Patent No.: US 9,506,250 B2
(45) Date of Patent: Nov. 29, 2016

(54) ASSEMBLY FOR CONNECTING REBAR SEGMENTS

(71) Applicants: Robert Gilling, Caro, MI (US); Carrick Pierce, Pacific Grove, CA (US); Eng Kiat Tng, Singapore (SG); Shuangyou Liu, Guangxi (CN); Brent Bennett, Gold Canyon, AZ (US)

(72) Inventors: Robert Gilling, Caro, MI (US); Carrick Pierce, Pacific Grove, CA (US); Eng Kiat Tng, Singapore (SG); Shuangyou Liu, Guangxi (CN); Brent Bennett, Gold Canyon, AZ (US)

( * ) Notice: Subject to any disclaimer, the term of this patent is extended or adjusted under 35 U.S.C. 154(b) by 361 days.

(21) Appl. No.: 14/178,143

(22) Filed: Feb. 11, 2014

(65) Prior Publication Data

US 2014/0227024 A1 Aug. 14, 2014

Related U.S. Application Data

(60) Provisional application No. 61/762,980, filed on Feb. 11, 2013, provisional application No. 61/762,978, filed on Feb. 11, 2013.

(51) Int. Cl.
*E04C 5/12* (2006.01)
*E02D 5/74* (2006.01)
(Continued)

(52) U.S. Cl.
CPC .............. *E04C 5/122* (2013.01); *E02D 5/74* (2013.01); *E04C 5/165* (2013.01); *E04G 21/12* (2013.01);
(Continued)

(58) Field of Classification Search
CPC ........ F16B 2/065; E04C 5/163; E04C 5/165; E04C 5/122; Y10T 403/5733; Y10T 403/5793; Y10T 403/7052; Y10T 403/7054; Y10T 403/7058
See application file for complete search history.

(56) References Cited

U.S. PATENT DOCUMENTS

| 165,546 A | * | 7/1875 | Cook ..................... F16G 11/04 279/42 |
| 457,209 A | * | 8/1891 | Montague ............... F16G 11/04 403/314 |

(Continued)

FOREIGN PATENT DOCUMENTS

| CA | 2515758 A1 | 2/2006 |
| CN | 2186274 Y | 12/1994 |

(Continued)

OTHER PUBLICATIONS

International search report mailed Jun. 17, 2014 (PCT/US2014/015871).

(Continued)

*Primary Examiner* — Jonathan Masinick
(74) *Attorney, Agent, or Firm* — John S. Artz; Dickinson Wright, PLLC (57) ABSTRACT

An assembly for connecting a first rebar segment and a second rebar segment. The assembly includes a first wedge and second wedge, each defining a hollow for receiving the first and second rebar segments, respectively. A first barrel and a second barrel each define a passage for receiving the first and second wedges, respectively. The passages are tapered for mating engagement with the wedges for driving the wedges radially inwardly in response to the wedges being in the passages and axially engaged by the barrels to tighten the wedges about the rebar segments. A cap defines an opening, a stopping surface, and a channel that extends axially between the opening and the stopping surface, receiving the first and second barrels in axial alignment with one another. A coupling connects the cap and one of the barrels, inhibiting axial movement of the barrels out of the channel of the cap.

17 Claims, 6 Drawing Sheets

(51) Int. Cl.
*E21D 21/00* (2006.01)
*E04C 5/16* (2006.01)
*E04G 21/12* (2006.01)

(52) U.S. Cl.
CPC ......... *E04G 21/121* (2013.01); *E21D 21/0086* (2013.01); *Y10T 403/3986* (2015.01); *Y10T 403/50* (2015.01)

(56) References Cited

U.S. PATENT DOCUMENTS

| | | | |
|---|---|---|---|
| 2,699,589 A | | 1/1955 | Redell |
| 2,896,496 A | | 1/1958 | Jansen |
| 3,117,485 A | | 1/1964 | Jansen |
| 3,521,913 A | * | 7/1970 | Verhein ................. F16L 21/005 285/109 |
| 3,551,999 A | * | 1/1971 | Gutmann ............... B21D 39/04 29/517 |
| 3,971,177 A | | 7/1976 | Endo |
| 4,143,986 A | | 3/1979 | Antosh |
| 4,192,215 A | * | 3/1980 | Hymans ................. E04C 5/122 24/122.6 |
| 4,408,926 A | * | 10/1983 | Werner ..................... F16B 2/14 403/300 |
| 4,469,465 A | | 9/1984 | Andrus |
| 4,752,252 A | * | 6/1988 | Cherry ................. H01R 4/5025 439/784 |
| 4,815,360 A | * | 3/1989 | Winterle ................... F16J 1/12 29/888.051 |
| 4,911,582 A | | 3/1990 | Peirce, Jr. et al. |
| 5,193,932 A | * | 3/1993 | Wu ......................... E04C 5/165 403/307 |
| 5,525,013 A | | 6/1996 | Seegmiller et al. |
| 5,606,839 A | * | 3/1997 | Baumann ................ E04C 5/165 403/305 |
| 6,176,051 B1 | | 1/2001 | Sorkin |
| 6,565,288 B1 | | 5/2003 | McCallion |
| 6,622,442 B2 | * | 9/2003 | Kwon ................... E01D 19/125 403/348 |
| 7,743,580 B2 | | 6/2010 | DeLoach, Sr. |
| 7,819,388 B2 | | 10/2010 | McCallion |
| 8,251,617 B2 | | 8/2012 | Leppanen |
| 8,313,345 B2 | | 11/2012 | Purdy |
| 8,388,377 B2 | | 3/2013 | Zraik |
| 8,398,421 B2 | | 3/2013 | Haberek et al. |
| 8,413,396 B2 | | 4/2013 | Oliva et al. |
| 2002/0001504 A1 | | 1/2002 | McCallion |
| 2004/0040247 A1 | | 3/2004 | Morse |
| 2006/0059841 A1 | | 3/2006 | Bennett et al. |
| 2009/0041550 A1 | | 2/2009 | Oldsen et al. |
| 2012/0011800 A1 | | 1/2012 | Moseid |
| 2012/0233956 A1 | | 9/2012 | Fey |
| 2014/0020328 A1 | | 1/2014 | Yee |

FOREIGN PATENT DOCUMENTS

| | | | | |
|---|---|---|---|---|
| EP | 1375774 A1 | 1/2004 | | |
| JP | H07279317 A | 10/1995 | | |
| KR | WO 2004005627 A1 | * 1/2004 | ............ | E04C 5/122 |
| KR | WO 2004022876 A1 | * 3/2004 | ............ | E04C 5/165 |
| WO | 2004022876 A1 | 3/2004 | | |

OTHER PUBLICATIONS

Collet Assembly, Milwaukee Tools, Webpage, http://www.milwaukeetool.com/accessories/miscellaneous/48-66-2090.
Die Grinder Collet ⅛", Milwaukee Tools, Webpage, http://www.milwaukeetool.com/accessories/miscellaneous/48-66-0965.
Collet Nut ¼", Milwaukee Tools, Webpage, http://www.milwaukeetool.com/accessories/miscellaneous/48-68-0031.
Collet Body ¼", Milwaukee Tools, Webpage, http://www.milwaukeetool.com/accessories/miscellaneous/48-68-0040.

\* cited by examiner

ASSEMBLY FOR CONNECTING REBAR SEGMENTS

CROSS REFERENCE TO RELATED APPLICATION

This application claims the benefit of application Ser. No. 61/762,980, filed on Feb. 11, 2013, and application Ser. No. 61/762,978, filed on Feb. 11, 2013, which are hereby incorporated by reference as though set forth fully herein. This application cross references U.S. patent application Ser. No. 14/178,119 entitled "Assembly and Method for Anchoring Rebar to a Mass," which is filed concurrently herewith and which is incorporated by reference as though set forth fully herein.

BACKGROUND OF THE DISCLOSURE

1. Field of the Disclosure

An assembly for connecting rebar segments.

2. Description of the Prior Art

Assemblies for connecting a first rebar segment and a second rebar segment for use in the construction industry are generally known in the art. One such assembly is disclosed in Chinese Utility Model No. CN 2186274Y to Yangsheng et al. which includes a first wedge that extends about and along an axis and defines a first hollow that extends along the axis for receiving the first rebar segment. A second wedge extends about and along the axis and defines a second hollow along the axis for receiving the second rebar segment. A first barrel extends about and along the axis and defines a first passage for receiving the first wedge. The first passage is tapered for mating engagement with the first wedge for driving the first wedge radially inwardly in response to the first wedge being in the first passage and axially engaged by the first barrel to tighten the first wedge about the first rebar segment. A second barrel extends about and along the axis and defines a second passage for receiving the second wedge. The second passage is tapered for mating engagement with the second wedge for driving the second wedge radially inwardly in response to the second wedge being in the second passage and axially engaged by the second barrel to tighten the second wedge about the second rebar segment.

Such assemblies suffer from certain drawbacks, as they are difficult to assemble and prone to loosening at undesirable times, since the first and second barrels are exposed while the device is used. Additionally, such assemblies are reliant upon threads on the bores of the barrel for tightening the first and second barrels about a threaded bolt between the wedges, and therefore tend to provide for an insufficient radial force against the rebar to prevent slippage of the wedge relative to the rebar, as commonly required by construction specifications for structural concrete reinforcing projects. Furthermore, such assemblies are configured to only receive rebar segments that are threaded, leading to increased expenditures and/or preparation time as pre-threaded rebar has to be purchased or threads need to be added to the rebar at the job site.

SUMMARY AND ADVANTAGES OF THE DISCLOSURE

The disclosure provides for such an assembly and further including a cap defining an opening and a stopping surface, and defining a channel extending axially between the opening and the stopping surface for receiving the first and second barrels in axial alignment with one another. The disclosure further includes a coupling defined by said cap and one of said barrels connecting the cap and one of the barrels for inhibiting axial movement of the barrels out of the channel of the cap to maintain a biasing force from the wedges against the rebar segments.

Thus several advantages of one or more aspects of the disclosure are that the wedges and barrels are contained within the cap, and are therefore less prone to being tampered with at undesirable times. Additionally, since the coupling between the cap and barrel inhibits the barrels and wedges from moving out of the channel, the rebar segments inhibit sliding relative to one another or becoming separated from one another in both axial directions. Furthermore, the barrels and wedges are not reliant upon threads to be tightened relative to one another. Accordingly, other tools can advantageously be used to axially drive the wedges into the bores of the barrel, allowing the wedges to be "pre-loaded" at or near yield strength of the rebar prior to being disposed in the cap. This advantageously inhibits movement of the wedge relative to the rebar in response large external forces. Additionally, the assembly advantageously can receive any type or rebar, as it is not necessary for the rebar to be threaded. This leads to reduced costs and time spent in preparing rebar segments in the field, as the rebar does not need to be pre-threaded prior to being connected to the assembly. Further, the assembly is easy to assemble by operators in the field, is comprised of few parts, and is inexpensive to manufacture.

BRIEF DESCRIPTION OF THE DRAWINGS

Other aspects of the present disclosure will be readily appreciated, as the same becomes better understood by reference to the following detailed description when considered in connection with the accompanying drawings wherein.

DETAILED DESCRIPTION OF THE ENABLING EMBODIMENTS

An assembly 20, 120 for connecting a first rebar segment 22 and a second rebar segment 24 is generally shown. It should be appreciated that the assembly 20 could be used to connect any kind of rebar segment, including but not limited to, two different sized rebars with different external features.

The assembly 20, 120 includes a first wedge 26, 126, generally indicated, and a second wedge 28, 128, generally indicated, of metal material for engaging the first and second rebar segments 22, 24, respectively. The wedges 26, 28, 126, 128 each have a frustoconical shape, and each define a proximal region 30 and a distal end 32. The wedges 26, 28, 126, 128 each extend about and along an axis A from the proximal region 30 to the distal end 32, and both of the wedges 26, 28, 126, 128 are tapered from the proximal region 30 to the distal end 32. The first and second wedges 26, 28, 126, 128 integrally join one another at the proximal region 30 of the wedges 26, 28, 126, 128 to define a center 34. It should be appreciated that the wedges 26, 28, 126, 128 could be made of other materials, such as but not limited to, an organic polymeric material. Further it should be appreciated that the wedges 26, 28, 126, 128 could be separate components, rather than integral components that meet at the center 34.

The first wedge 26, 126 defines a first hollow 36 that extends along the axis A between the proximal region 30 and said distal end 32, and the second wedge 28, 128 defines a second hollow 37 that extends along the axis A between the proximal region 30 and the distal end 32. The hollows 36, 37 of each of the wedges 26, 28, 126, 128 present a plurality of teeth 38 for gripping one of the rebar segments 22, 24 to inhibit axial movement of the rebar segments 22, 24 relative to the wedges 26, 28, 126, 128. It should be appreciated that the teeth 38 could have various shapes and sizes.

Each of the wedges 26, 28, 126, 128 is divided into a plurality of sections 40 of equal size and shape, and each includes a pair of radial faces 42 that extend radially inwardly toward the axis A, and extend parallel to the axis A. It should be appreciated that the wedges 26, 28, 126, 128 could be divided into any number of sections 40 of various shapes and sizes.

The assembly 20 further includes a first barrel 44, generally indicated, of metal material and having a cylindrical shape. The first barrel 44 has a backward extremity 46 and a frontward extremity 48, and it extends about and along the axis A between the backward extremity 46 and the frontward extremity 48. The first barrel 44 defines a first passage 50 that extends axially therethrough between the backward extremity 46 and the frontward extremity 48 for receiving the distal end 32 of the first wedge 26 and the first rebar segment 22. The first passage 50 is tapered from the backward extremity 46 toward the frontward extremity 48 at the same angle as the first wedge 26 for mating engagement with the first wedge 26 for driving the first wedge 26 radially inwardly in response to the first wedge 26 being in the passage 50 and axially engaged by the first barrel 44. A first protrusion 52 having a cylindrical shape extends axially from the frontward extremity 48 of the first barrel 44. The first passage 50 of the first barrel 44 further extends through the first protrusion 52. The first barrel 44 defines an outer surface 54.

The assembly 20 also includes a second barrel 56, generally indicated, of metal material and having a cylindrical shape. The second barrel 56 has a back extremity 58 and a front extremity 60 and extends about and along the axis A between the back extremity 58 and the front extremity 60. The second barrel 56 defines a second passage 59 that extends axially therethrough between the back extremity 58 and the front extremity 60 for receiving the distal end 32 of the second wedge 28 and the second rebar segment 24. The second passage 59 is tapered from the back extremity 58 toward the front extremity 60 at the same angle as the second wedge 28 for mating engagement with the second wedge 28 for driving the second wedge 28 radially inwardly in response to the second wedge 28 being in the second passage 59 and axially engaged by the second barrel 56. A second protrusion 62 having a cylindrical shaped extends axially from the front extremity 60 of the second barrel 56. The second passage 59 of the second barrel 56 further extending through the second protrusion 62. It should be appreciated that the first and second barrels 44, 56 could be made out of other materials, such as but not limited to, an organic polymeric material. Further it should be appreciated that the first and second barrels 44, 56 could be made without the first and second protrusions 52, 62. In other words, the backward extremity 46 and the front extremity 60 could extend to the same length as that of the first and second protrusions 52, 62.

The assembly 20, 120 also includes a cap 64, 164, generally indicated, that defines an opening 66 and a stopping surface 68, and defines a channel 70 that extends axially between the opening 66 and the stopping surface 68 for receiving the first and second barrels 44, 56 in axial alignment with one another. The cap 64, 164 defines an inner surface in the channel 70. An annular ring 72 extends axially away from the stopping surface 68 and about the axis A in the channel 70 for receiving the second protrusion 62 of the second barrel 56. Additionally, it should be appreciated that the second protrusion 62 and ring 72 could have various shapes to fit snug with one another, such as but not limited to, matching tapered shapes. Additionally, it should be appreciated that the cap 64, 164, could be made without the ring 72. Further, the stopping surface 68 defines a slot 74 having a circular shape that extends axially therethrough for receiving the second rebar segment 24.

In order to secure the wedges 26, 28, 126, 128 about the rebar segments 22, 24, barrels 44, 56 are disposed about the rebar segments 22, 24 in axial alignment with one another with the wedges 26, 28 disposed therein. The barrels 44, 56 are then squeezed axially toward one another to drive the wedges 26, 28, 126, 128 radially inwardly toward the rebar to secure the wedges 26, 28, 126, 128 to the rebar. It should be appreciated that the barrels 44, 56 could be squeezed axially toward one another using various tools, such as but not limited to, a C-clamp, hydraulic actuator of the clamping or spreading type. It should further be appreciated that the tool could engage the first and second protrusions 52, 62 or the backward extremity 46 and the front extremity 60. It should further be appreciated that the force applied by such tools can be large in magnitude and similar to the yield force of the rebar, ensuring that slippage of the wedges 26, 28, 126, 128 relative to the rebar segments 22, 24 in either axial direction is prevented during use of the assembly 20, 120. It should also be appreciated that the assembly is able to utilize such tools since the wedges 26, 28, 126, 128 are driven into the barrels 44, 56 prior to being inserted into the cap 64, 164, utilize the cap 64, 164 to tighten the barrels 44, 56 about the wedges 26, 28, 126, 128.

A coupling 75, generally indicated, connects the cap 64, 164 and one of the barrels 44, 56 for inhibiting axial movement of the barrels 44, 56 out of the channel 70 of the cap 64, 164 to maintain a biasing force from the wedges 26, 28, 126, 128 against the rebar segments 22, 24. The coupling 75 includes a plurality of barrel threads on the outer surface 54 of the first barrel 44, and a plurality of channel threads on the inner surface of the cap 64, 164 for threadedly engaging one another to allow a user to threadedly and axially move the barrels 44, 56 relative to the cap 64, 164 to bias the second barrel 56 against the stopping surface 68 to maintain a biasing force from the wedges 26, 28, 126, 128 against the rebar segments 22, 24. It should be appreciated that the coupling 75 could be other types of fastening devices, such as but not limited to, a snap-fit type mechanism.

In the first enabling embodiment as best presented in FIGS. 1-6, the assembly 20 further includes a locator 82, 182, generally indicated, for being partially disposed in the hollow 36 of each of the wedges 26, 28 for coaxially aligning the rebar segments 22, 24 with the wedges 26, 28.

It should be appreciated that both embodiments of the assembly 20, 120 could be constructed with or without such a locator 82, 182. The wedges 26, 28 define a plurality of orifices 84 extending radially inwardly toward the axis A and circumferentially spaced from one another about the wedges 26, 28 at the center 34 of the wedges 26, 28. The locator 82 includes a disc 86 for engaging the rebar segments 22, 24, presenting a periphery 88 and a pair of faces 90. A plurality of legs 92 having a cylindrical shape extend radially outwardly from the opening 66 for being received by the orifices 84 of the wedges 26, 28 for positioning the sections 40 of the wedges 26, 28 in alignment with one another. It should be appreciated that any number of legs 92 and orifices 84 could be present.

Figure 1:
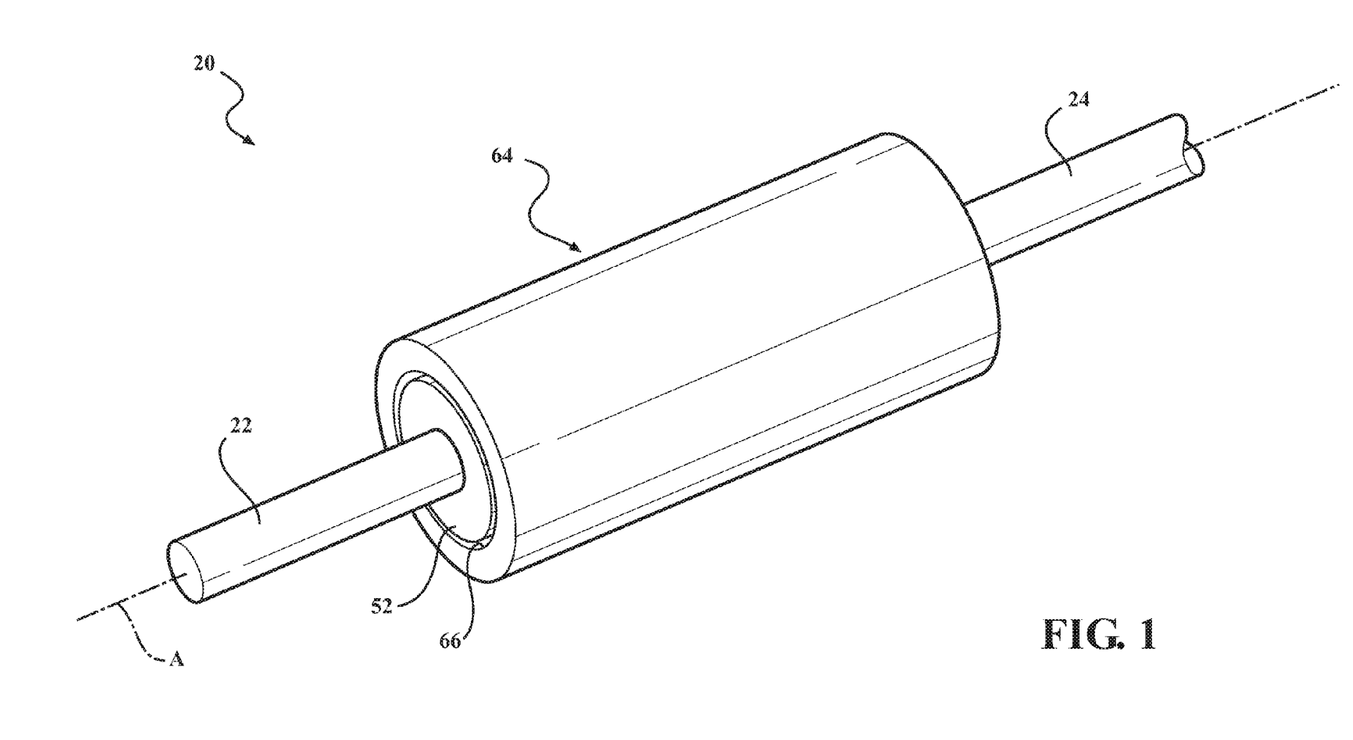
FIG. 1 is a perspective view of the first enabling embodiment.
Figures 2, 3:
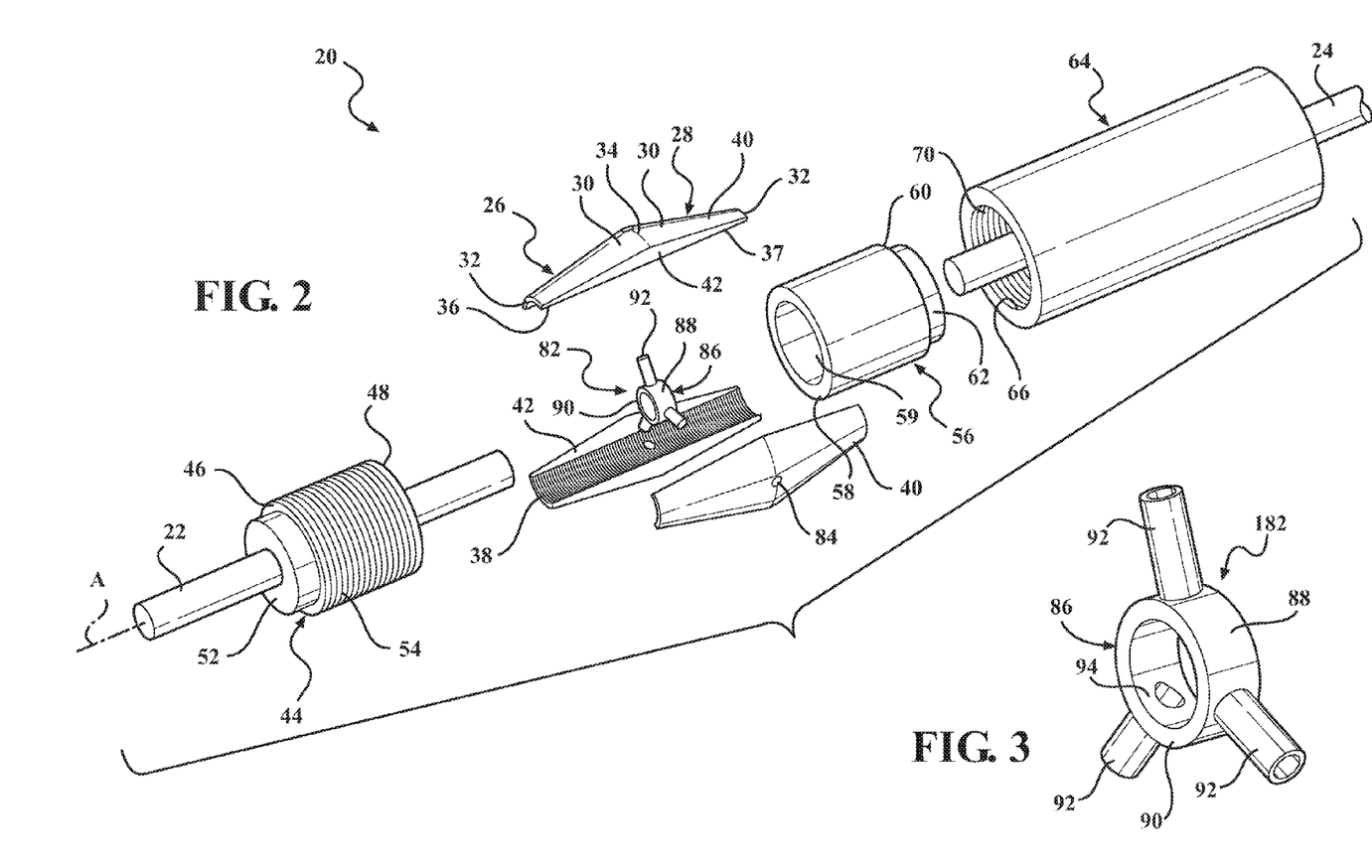
FIG. 2 is a perspective exploded view of the first enabling embodiment.
FIG. 3 is a perspective view of an alternate embodiment of a locator in accordance with an aspect of the disclosure.
Figure 4:
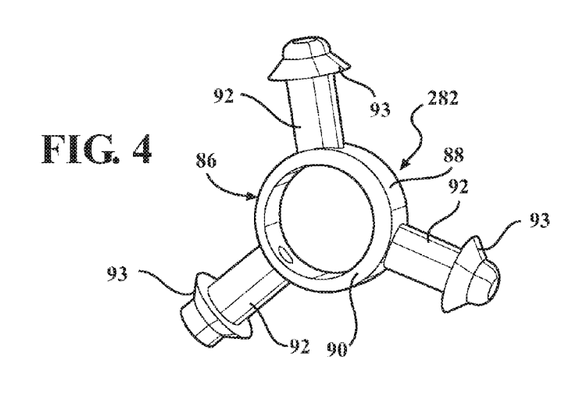
FIG. 4 is a perspective view of an alternate embodiment of a locator in accordance with an aspect of the disclosure.
Figure 5:
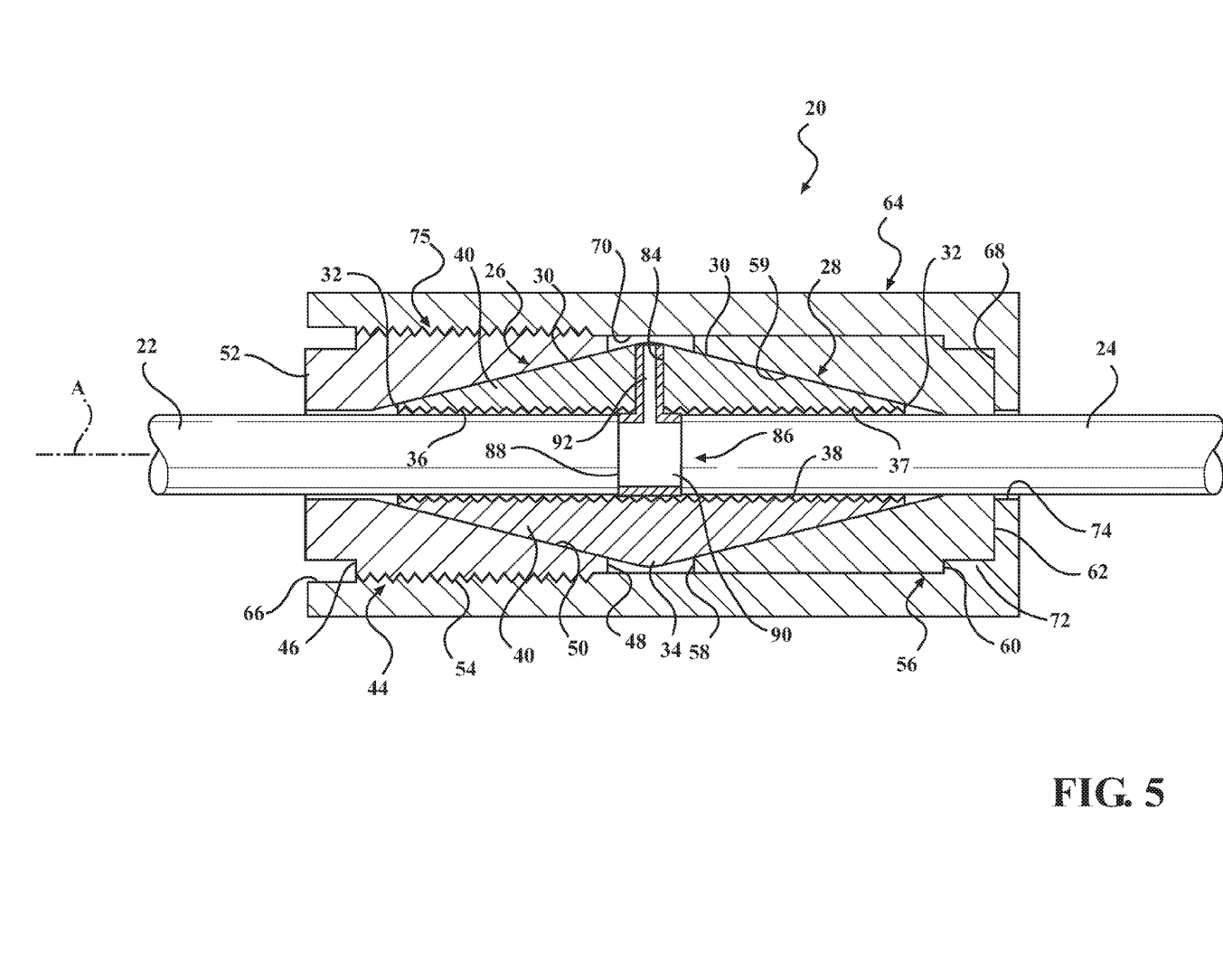
FIG. 5 is a cutaway view of the first enabling embodiment.
Figure 6:
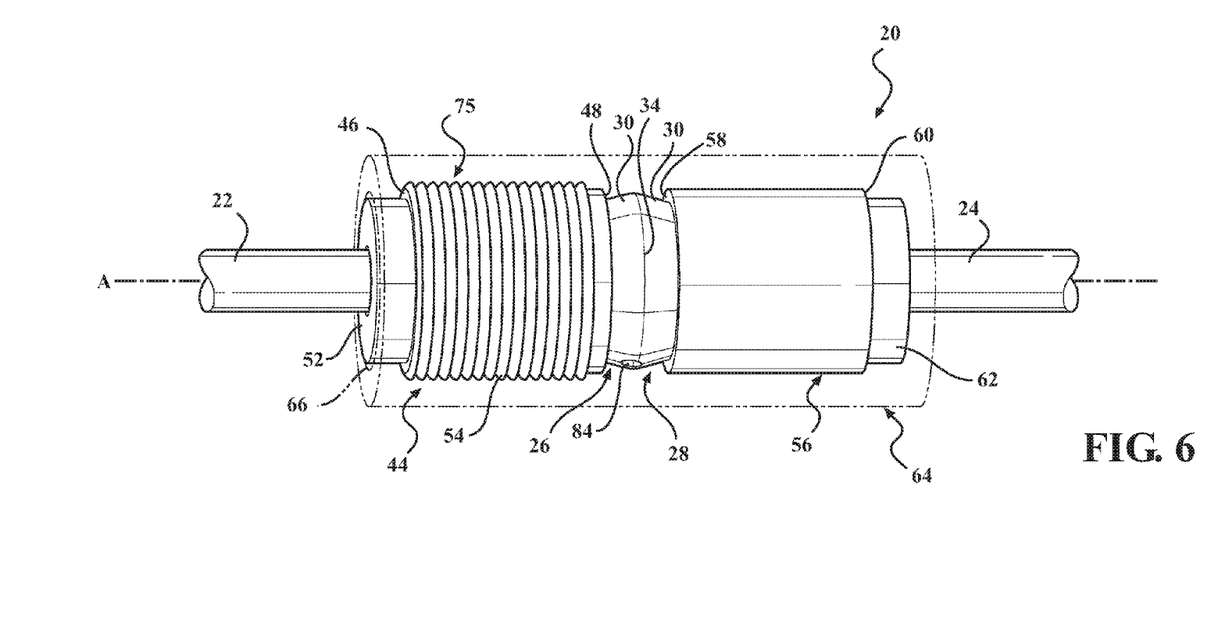
FIG. 6 is a perspective view of the first enabling embodiment with the cap in transparent shading.

As best presented in FIG. 3, the disc 86 of the locator 182 could alternatively define a hole 94 having a circular shape extending axially therethrough for receiving the rebar segments 22, 24 to align the rebar segments 22, 24 in the wedges 26, 28. Further, as best presented in FIG. 4, each leg 92 of the locator 282 could include an outwardly extending flange 93 being tapered. In this embodiment, each of the orifices 84 includes a tapered face (not shown) that mates with the flange of the locator for aligning the legs 92 within the orifices 84 at a predetermined radial distance.

Figure 7:
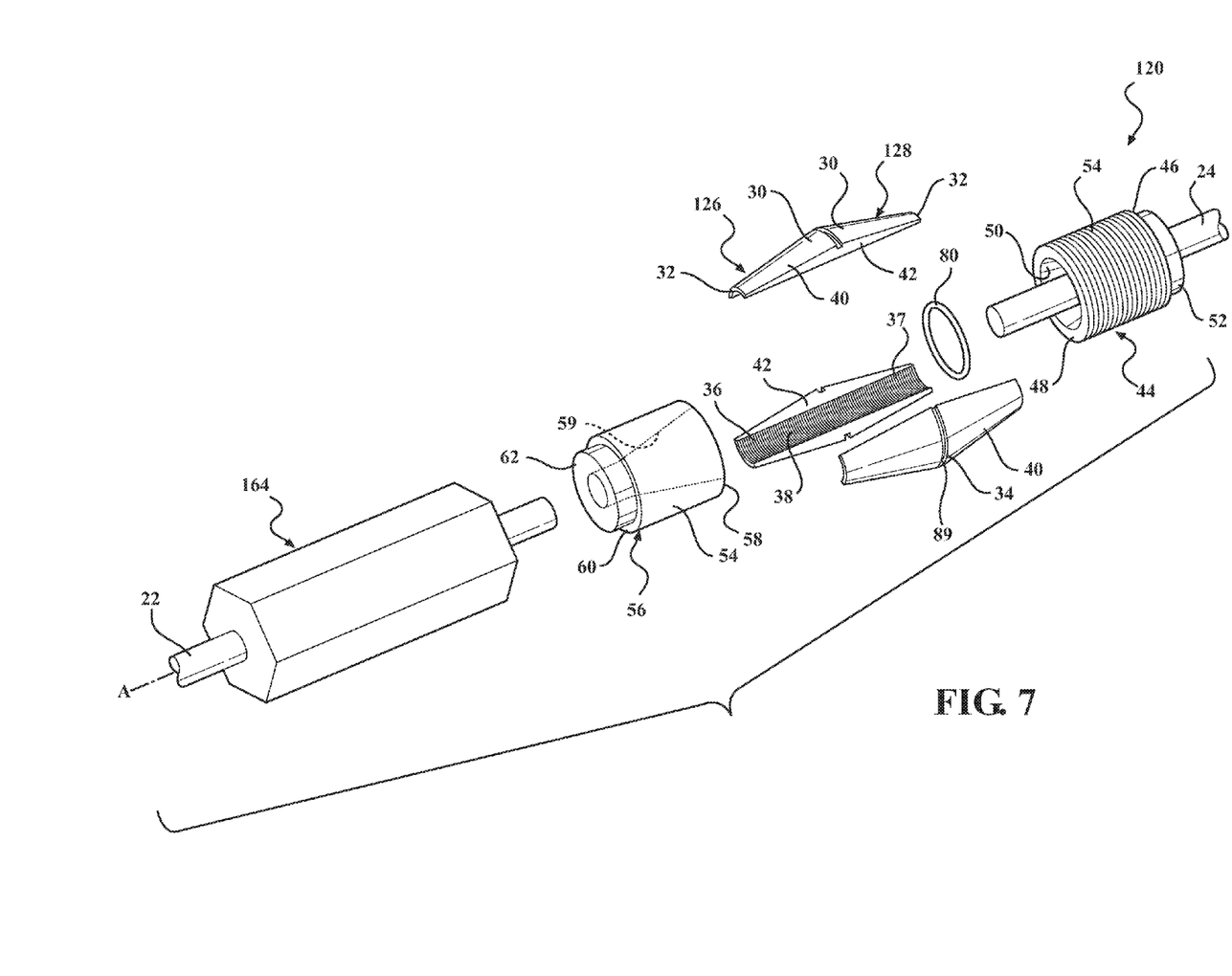
FIG. 7 is a perspective exploded view of the second enabling embodiment.
Figure 8:
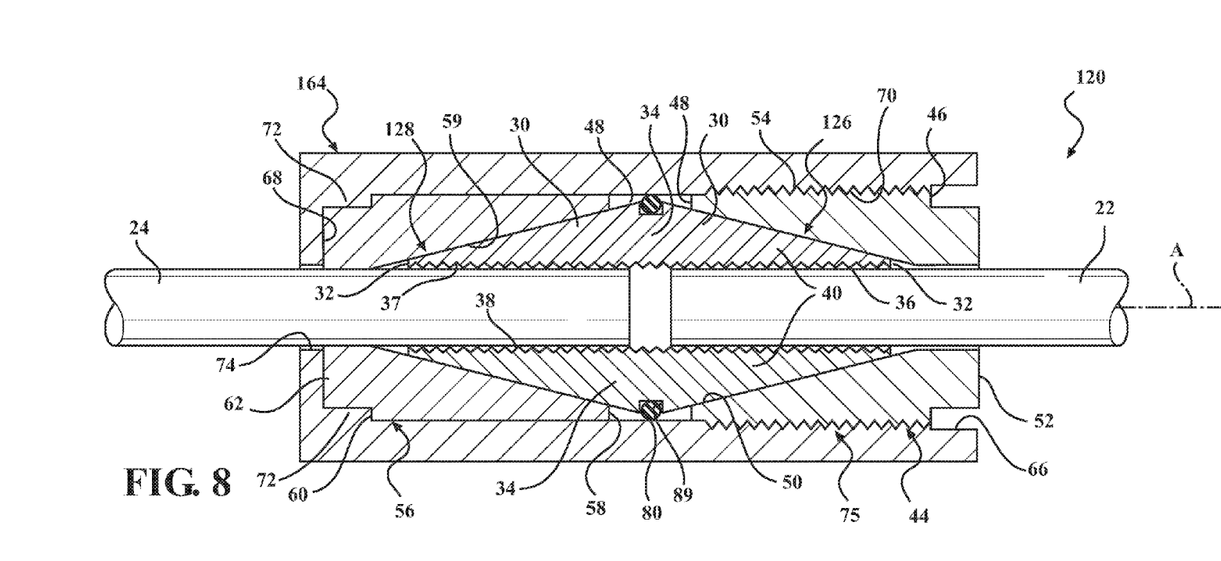
FIG. 8 is a cutaway view of the second enabling embodiment.

In the second enabling embodiment as best presented in FIGS. 7 and 8, the center 34 of the wedges 26, 28 defines a groove 89 that extends circumferentially about the proximal region 30 of the wedges 26, 28. An O-ring 80 is disposed in the groove 89 to bias the sections 40 of the wedges 26, 28 radially inwardly for biasing the wedges 26, 28 against the rebar segments 22, 24 and the radial faces 42 toward one another. Further, in the first enabling embodiment, the cap 164 has a hexagonal shaped cross-section so that it may be tightened with a wrench. It should be appreciated that the cap 164 could have various shapes for either embodiment, such as but not limited to, a square shaped cross-section or circular shaped cross section.

Figure 9:
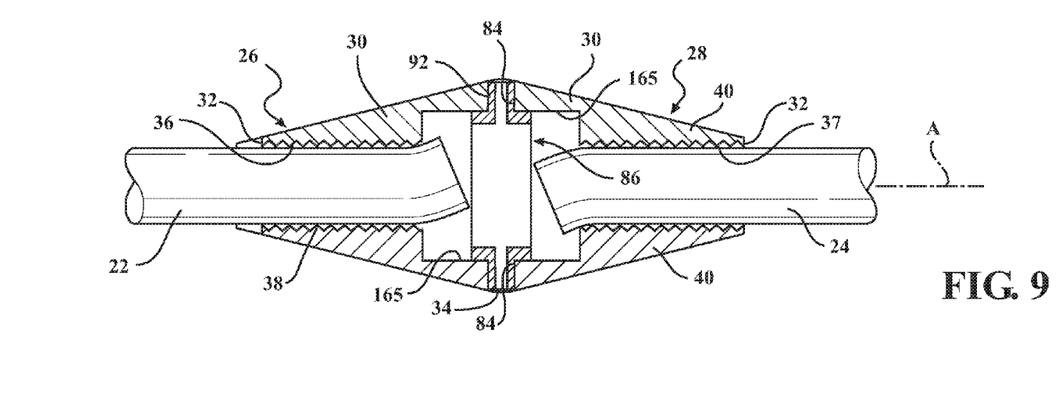
FIG. 9 is a cutaway side view of an alternate embodiment of the wedge with a recess defined there.

In a further alternate embodiment of the assembly as best presented in FIG. 9, the hollows 36, 37 of the wedges define a recess 165 having a rectangular shaped cross section extending radially outwardly. The recess can accommodate burred, or otherwise disfigured ends of the rebar segments that can commonly be formed when the rebar segments 22, 24 are flame cut or sheared. It should be appreciated that the cross section of the recess could have other shapes, such as but not limited to, an arc shape.

Obviously, many modifications and variations of the present disclosure are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An assembly for connecting a first rebar segment and a second rebar segment comprising:
    a first wedge extending about and along an axis and defining a first hollow extending along said axis for receiving the first rebar segment;
    a second wedge extending about and along said axis and defining a second hollow along said axis for receiving the second rebar segment;
    a first barrel extending about and along said axis and defining a first passage for receiving said first wedge,
    said first passage being tapered for mating engagement with said first wedge for driving said first wedge radially inwardly in response to said first wedge being in said first passage and axially engaged by said first barrel to tighten said first wedge about the first rebar segment,
    a second barrel extending about and along said axis and defining a second passage for receiving said second wedge,
    said second passage being tapered for mating engagement with said second wedge for driving said second wedge radially inwardly in response to said second wedge being in said second passage and axially engaged by said second barrel to tighten said second wedge about the second rebar segment,
    a cap defining an opening and a stopping surface and defining a channel extending axially between said opening and said stopping surface for receiving said first and second barrels in axial alignment with one another,
    a coupling defined by said cap and one of said barrels for connecting said cap and one of said barrels to inhibit axial movement of said barrels out of said channel of said cap to maintain a grip of said wedges about the rebar segments,
    wherein said wedges each have a proximal region and a distal end and extend along said axis from said proximal region to said distal end, wherein said first and second wedges integrally join one another at said proximal region of said wedges to define a center, and wherein said wedges are divided into a plurality of sections of equal size and shape and each include a pair of radial faces extending radially inwardly towards said axis and extending parallel to said axis.

2. An assembly as set forth in claim 1 wherein said first barrel defines an outer surface and said cap defines an inner surface in said channel,
    said first barrel is disposed axially adjacent to said opening and said second barrel is disposed axially adjacent to stopping surface,
    said coupling is defined by said outer surface of said first barrel and said inner surface of said cap wherein said outer surface of said first barrel and said inner surface of said cap engage one another to allow a user to apply a force against from said barrels against said cap to bias said second barrel against said stopping surface of sap cap to maintain a biasing force from said wedges against said rebar segments.

3. An assembly as set forth in claim 2 wherein said coupling includes a plurality of barrel threads on said outer surface of said first barrel and a plurality of channel threads on said inner surface of said cap for threadedly engaging one another.

4. An assembly set forth in claim 1 wherein said first and second hollows define a recess extending radially outwardly away from the axis for providing for containing segments of rebar that have various shapes at an end.

5. An assembly as set forth in claim 1 wherein said wedges each have a frustoconical shape,
    each of said wedges are tapered from said proximal region to said distal end.

6. An assembly as set forth in claim 1 wherein said center of said wedges define a groove extending circumferentially about said proximal region of said wedges.

7. An assembly as set forth in claim 6 and further including an O-ring disposed in said groove for biasing said sections of said wedges radially inwardly for biasing said wedges against the rebar segment and said radial faces towards one another.

8. An assembly as set forth in claim 6 and further including a locator for being partially disposed in said hollow of each of said wedges for coaxially aligning the rebar segments with said wedges.

9. An assembly as set forth in claim 8 wherein said wedges define a plurality of orifices extending radially inwardly toward said axis and circumferentially spaced from one another about said center of said wedges.

10. An assembly as set forth in claim 9 wherein said locator includes a disc for engaging the rebar segments presenting a periphery and a pair of faces.

11. An assembly as set forth in claim 10 wherein said locator further includes a plurality of legs extending radially outwardly from said periphery for being received by said orifices of said wedges for positioning said sections of said wedges in alignment with one another.

12. An assembly as set forth in claim 11 and further including a flange being tapered extending outwardly from each of said legs for aligning each of said legs in said orifices at a predetermined radial distance.

13. An assembly as set forth in claim 11 wherein said disc of said locator defines a hole having a circular shape extending axially therethrough for receiving the rebar segment.

14. An assembly for connecting a first rebar segment and a second rebar segment comprising:
a first wedge having a frustoconical shape and having a proximal region and a distal end and extending about and along an axis from said proximal region to said distal end,
a second wedge having a frustoconical shape and having a proximal region and a distal end and extending about and along said axis from said proximal region to said distal end for engaging the second rebar segment,
said wedges each being tapered from said proximal region to said distal end,
said first wedge defining a first hollow extending along said axis between said proximal region and said distal end,
said second wedge defining a second hollow extending along said axis between said proximal region and said distal end,
said hollows of each of said wedges presenting a plurality of teeth for gripping one of the rebar segments to inhibit axial movement of the rebar segment relative to said wedges,
each of said wedges being divided into a plurality of sections of equal size and shape and each including a pair of radial faces extending radially inwardly toward said axis and extending parallel to said axis,
a first barrel of metal material having a cylindrical shape and having a backwards extremity and a frontward extremity and extending about and along said axis between said backward extremity and said frontward extremity,
said first barrel defining a first passage extending axially therethrough between said backwards extremity and said frontward extremity for receiving said distal end of first wedge and the first rebar segment,
said first passage being tapered from said backwards extremity toward said frontward extremity at the same angle as said first wedge for mating engagement with said first wedge for driving said first wedge radially inwardly in response to said first wedge being in said passage and axially engaged by said first barrel,
a second barrel of metal material having a cylindrical shape and having a back extremity and a front extremity and extending about and along said axis between said back extremity and said front extremity,
said second barrel defining a second passage extending axially therethrough between said back extremity and said front extremity for receiving said distal end of second wedge and the second rebar segment,
said second passage being tapered from said back extremity towards said front extremity at the same angle as said second wedge radially inwardly in response to said second wedge being in said second passage and axially engaged by said second barrel,
said first and second wedge integrally joining one another at said proximal region of said wedges to define a center,
a first protrusion having a cylindrical shape extending axially from said frontward extremity of said first barrel,
said first passage of said first barrel further extending through said first protrusion,
a second protrusion having a cylindrical shape extending axially from said front extremity of said second barrel,
said passage of said second barrel further extending through said second protrusion,
a cap defining an opening and a stopping surface and defining a channel extending axially between said opening and said stopping surface receiving said first and second barrels in axial alignment with one another,
a coupling defined by said cap and one of said barrels connecting said cap and one of said barrels for inhibiting axial movement of said barrels out of said channel of said cap to maintain a grip of said wedges about the rebar segments,
said cap defining an inner surface in said channel,
said first barrel defining an outer surface,
said coupling including a plurality of barrel threads on said outer surface of said first barrel and a plurality of channel threads on said inner surface of said cap for threadedly engaging one another to allow a user to threadedly and axially move said barrels relative to said cap to bias said second barrel against said stopping surface to maintain a grip of said wedges against said rebar segments,
a ring extending axially away from said stopping surface and about said axis in said channel for receiving said second protrusion of said second barrel,
said stopping surface defining a slot having a circular shape extending axially therethrough for receiving the second rebar segment,
said channel being threaded internally from said opening for threadedly engaging said threaded outer surface of said first barrel for axially moving said first and second barrels toward said stopping surface of said cap to secure said first and second wedges about the first and second rebar segments.

15. An assembly as set forth in claim 14 wherein said center of said wedges defines a groove extending circumferentially about said proximal region of said wedges,
an O-ring disposed in said groove of said wedges biasing said sections of said wedges radially inwardly for biasing said wedges against the rebar segments and said radial faces toward one another,
said cap has a hexagonal shaped cross-section.

16. An assembly as set forth in claim 15 wherein said wedges further include a locator for being partially disposed in said hollow of each of said wedges for coaxially aligning the rebar segment with said wedges, said wedges defining a plurality of orifices extending radially inwardly toward said axis and circumferentially spaced from one another about said wedges at said center of said wedges, said locator including a disc for engaging the rebar segments presenting a periphery and a pair of faces, and said locator including a plurality of legs having a cylindrical shape extending radially outwardly from said the periphery for being received by said orifices of said wedges for positioning said sections of said wedges in alignment with one another.

17. An assembly as set forth in claim 16 wherein said disc of said locator defines a hole having a circular shape extending axially therethrough for receiving the rebar segment.

* * * * *